United States Patent Office 3,288,770
Patented Nov. 29, 1966

3,288,770
WATER SOLUBLE QUATERNARY
AMMONIUM POLYMERS
George B. Butler, Gainesville, Fla., assignor to Peninsular ChemResearch, Inc., Gainesville, Fla., a corporation of Florida
No Drawing. Filed Dec. 14, 1962, Ser. No. 244,596
20 Claims. (Cl. 260—88.3)

This invention relates to the art of high molecular weight polymers, and provides novel, water-soluble, high molecular weight linear polymers having a linear chain of repeating rings with quaternary ammonium salt groups. This invention also provides a method for making such polymers.

The present invention results from the discovery that, if certain monomers having two sites of olefinic unsaturation separated from each other by three chain atoms, including a quaternary ammonium chloride group, are brought into contact with a free radical catalyst, such as a peroxide catalyst, surprisingly a new high molecular weight water-soluble polymer is obtained. This result is not observed from the polymerization of other quaternary ammonium salt polymers having identical structure but with an anion other than the chloride anion. Similarly, if more than two olefinic sites are present in the molecule, or if these are spaced from each other other than as specified above, the polymers of this invention are not obtained.

Prior to this invention, it was known that quaternary ammonium halides having olefinically unsaturated radicals could be prepared as disclosed in U.S. Patent No. 2,611,768, and some of these which may be used in the present invention. It was also known that treating a poly-unsaturated quaternary ammonium bromide such as butyl-triallylammonium bromide with a peroxide would form an insoluble cross-linked quaternary ammonium salt polymer useful as an ion exchange resin, and that such ion exchange resins could also be made by the copolymerization of di-unsaturated quaternary ammonium bromides with poly-unsaturated quaternary ammonium bromides. These insoluble cross-linked ion exchange resins are disclosed in, for instance, U.S. Patent No. 2,687,382.

Polymerization of another kind of poly-unsaturated quaternary ammonium salt monomer is shown in U.S. Patent No. 2,946,757, and, as in U.S. Patent No. 2,687,382, cross-linked resins suitable for use as ion exchange materials are obtained.

Simple amines, not quaternized, with two sites of olefine unsaturation have also been polymerized and formed linear homopolymers, as has been disclosed in U.S. Patent No. 2,926,161, but no polymerization of a quaternized ammonium polymer has previously formed a high molecular weight product.

In contrast to these past experiments, the present invention provides polymers having quaternary ammonium salt groupings therein which are not cross-linked, of high molecular weight, and which are water-soluble. These are, thus, of a type and class distinct from such prior teachings.

The polymerization reaction of this invention to form the high molecular weight polymer appears to require the specific presence of the chloride anion. If the corresponding bromide monomer is used, the high molecular weight polymer is not obtained. However, other quaternary ammonium polymers may be obtained by this invention through replacement of the chloride ion on the polymer with other anions. Therefore, the present invention provides not only the high molecular weight water-soluble chloride anion polymers, but also other anion polymers as well through this second step.

The process for preparing the linear high molecular weight water-soluble polymer of the present invention consists in dissolving in water a quaternary ammonium chloride salt monomer in which the quaternary ammonium cation is represented by one of the formulae:

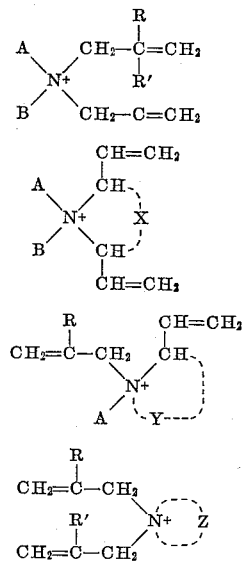

A catalytic amount of a free radical polymerization catalyst is also introduced into the solution, or it may already be there. The polymerization catalyst is preferably a peroxide catalyst such as t-butylperoxide, but others may also be used.

The resulting solution is maintained at a temperature of between 0° and 100° C. for about one to seventy-two hours, depending upon the temperature. The solid polymer may then be isolated from the reaction mixture and is essentially a linear homopolymeric molecular chain of repeating units having one of the formulae:

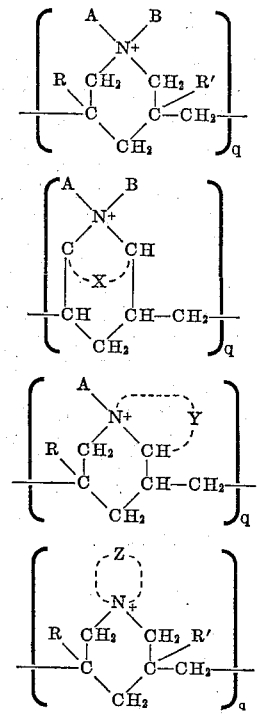

It will be appreciated that, with each such cationic ammonium group, there is associated a chloride anion.

In the above formulae, the symbols A and B independently represent an alkyl, hydroxyalkyl, or phenyl radical which may contain as substituents such groupings as amido, caroloweralkoxy, loweralkoxy, mono- and dicyclic aryloxy, cyano, thioloweralkoxy, thiophenoxy, or lower alkoyl (forming a ketonic group) radicals, 5- and 6-membered cycloalkyl groupings, and, on the alkyl groupings only, a nitro group, and on the phenyl radical only, a halogen atom (chlorine, bromine, fluorine, and iodine).

The symbols R and R' independently represent a hydrogen, chloro, bromo, or lower alkyl or phenyl radical, having substituents as stated under the definition for A and B above.

The symbol X stands for a divalent radical of the formula:

$$-CH_2-(O)_n-(CH_2)_m-$$

The symbol Y stands for a divalent radical of the formula:

$$-(CH_2)_p-(O)_n-CH_2-$$

The symbol Z stands for a divalent radical of a formula:

$$-(CH_2)_p-(O)_n-(CH_2)_2-$$

In these last-mentioned formulae, the small letter $n$ represents one of the numbers 0 and 1; the small letter $m$ represents one of the numbers 1 and 2; and the small letter $p$ represents one of the numbers 2 and 3.

In addition to teritary butyl peroxides, other peroxide catalysts may also be employed including inorganic peroxides typified by hydrogen peroxide and barium peroxide, etc.; organic peroxides such as the various diloweralkyl peroxides and loweralkyl hydrogen peroxides, diacyl peroxides such as acetyl peroxide and benzoyl peroxide, as well as peracids such as peracetic acid and perbenzoic acid.

Typical modes of practice of this invention are illustrated in the following examples of the same. It will be understood, of course, that this invention is not restricted to these examples in any way, but the same serve only to illustrate specific embodiments of the invention described above.

EXAMPLES OF THE INVENTION

*Example I*

Diallyldimethylammonium chloride (50 grams) were dissolved in distilled water (21.5 ml.) and t-butylhydroperoxide (19 drops) added. After thorough mixing, the container was thoroughly swept with nitrogen and sealed. The container and its contents were placed in an oven set at 50 °C. for twenty-four hours. After this time, the temperature of the oven was raised to 75° C., and the container and its contents allowed to remain at this temperature for twenty-four hours. After cooling, the solid polymer was dissolved by the addition of distilled water (42 ml.), to produce a very viscous solution. The solid polymer was isolated by addition of the aqueous solution to acetone (140 ml.) while stirring rapidly. The solid polymer was washed with three additional portions (140 ml.) of acetone to yield 48 grams of solid polymer after drying. The polymer was found to have an intrinsic viscosity of 1.35 in 0.1 N potassium chloride as solvent. In a preparation of polydiallyldimethylammonium bromide, using equivalent amounts and conditions, the intrinsic viscosity was found to be 0.17 in 0.1 N potassium bromide.

*Example II*

Diallyldimethylammonium chloride (190 grams) were dissolved in distilled water (82 ml.) and t-butylhydroperoxide (80 drops) added. After treatment as in Example I, heating in accordance with the same schedule, and isolation of the solid polymer as in Example I, 178 grams of solid polymer having an intrinsic viscosity of 1.04 in 0.1 N potassium chloride was obtained.

In order to establish that the astonishingly greater intrinsic viscosity of the polymeric chloride was a true indication of a much higher molecular weight and not merely a salt effect, the intrinsic viscosity of the polymeric chloride obtained in Examples I and II was determined in 0.1 N potassium bromide, and the value was essentially unchanged. The intrinsic viscosity of the polymeric bromide was then determined in 0.1 N potassium chloride, and was again found to be essentially unchanged.

*Example III*

Diallyldimethylammonium chloride (20 grams) were dissolved in distilled water (8.6 ml.) and t-butylhydroperoxide (4 drops) added. After thorough mixing, and stirring until the salt had completely dissolved, the container was swept with dry nitrogen until the air had been replaced, and sealed. After standing at 25° C. for 24 hours, the container was placed in an oven at 50° C. for 24 hours. The temperature of the oven was then raised to 75° C., and the solution permitted to remain at this temperature for an additional 24 hours. After cooling, the solid polymer was dissolved in distilled water (17.5 ml.), resulting in a very viscous solution. The solid polymer was isolated by addition of the aqueous solution to acetone (60 ml.). The polymer was washed with four additional portions (60 ml.) of acetone in a Waring Blendor to yield 19.5 grams of solid polymer, after thoroughly drying. The polymer was completely soluble in water and was found to have an intrinsic viscosity of 1.54 in 0.1 N sodium chloride as solvent. In a preparation of polydiallyldimethylammonium bromide, using equivalent amounts and conditions, a poor yield of polymer having an intrinsic viscosity of 0.19 in 0.1 N sodium bromide.

*Example IV*

In a preparation using equivalent amounts and conditions to those used in Example III, diallyldiethylammonium chloride was converted to polydiallyldiethylammonium chloride in nearly quantitative yield. The polymer was found to have an intrinsic viscosity of 1.32 in 0.1 N potassium chloride as solvent. As indicated by its intrinsic viscosity, polydiallyldiethylammonium bromide obtained under the same conditions was found to be of low molecular weight.

*Example V*

In a preparation using amounts and conditions equivalent to those used in Example I, diallylpiperidinium chloride was converted to polydiallylpiperidinium chloride in 96% yield. The intrinsic viscosity in 0.1 N potassium chloride of 1.26 indicates the molecular weight of this polymer is comparable to that of the other polyquaternary chlorides, but much higher than the corresponding bromide.

*Example VI*

Diallylmorpholinium chloride was converted to polydiallylmorpholinium chloride by a procedure equivalent to Example III. The yield of soluble polymer was 95% and the intrinsic viscosity of the polymer was found to be 1.43 in 0.1 N sodium chloride. Diallylmorpholinium bromide results in a polymer having an intrinsic viscosity consistent with other polyquaternary bromides when prepared by a similar procedure.

*Example VII*

By following the procedure of Example I, diallylpyrrolidinium chloride was converted to polydiallylpyrrolidinium chloride having a molecular weight consistent with those previously obtained with diallylquaternary ammonium chlorides, as indicated by its intrinsic viscosity in 0.1 N salt solution. The intrinsic viscosity of the corresponding bromide was consistent with that previously observed for other polydiallyl quaternary ammonium bromides, indicating again the unusual nature of the diallyl quaternary ammonium chlorides in polymerization reactions.

Example VIII

Diallyldiethanolammonium chloride was converted to the corresponding polymer by a procedure equivalent to that employed in Example III. The intrinsic viscosity of 1.28 and total polymer yield of 93% are consistent with high molecular weight and efficiency of the quaternary ammonium chloride as a monomer.

Example IX

N,N-diallylaniline was quaternized by reaction with methyl chloride, and the corresponding ammonium chloride was polymerized by the procedure of Example I. The intrinsic viscosity of the polymer was found to be consistent with high molecular weight, while the corresponding bromide polymer was of low molecular weight.

Example X

Diallyldi-n-butylammonium chloride was polymerized by the procedure of Example III to produce the polymer in almost quantitative yield. Determination of its intrinsic viscosity in 0.1 N sodium chloride and comparing this result with that of the corresponding polybromide showed that the molecular weights of the two polymers parallel those previously observed in similar compounds.

Example XI

Diallyldi-n-dodecylammonium chloride was converted to the corresponding polymer by the procedure of Example I. Again, the intrinsic viscosity of this polymer and the corresponding bromide, when determined in 0.1 N solutions of their respective alkali metal halides, were compared, the results were found to be consistent with those previously obtained.

Example XII

Dimethallyldimethylammonium chloride when converted to the corresponding polymer by the procedure of Example I was found to produce the polymer in the same molecular weight and yield range as in other similar polymerizations.

Example XIII

Methallyldimethylamine was quaternized by reaction with allyl chloride and the corresponding quaternary ammonium chloride was polymerized by the procedure of Example III to produce a polymer having an intrinsic viscosity of 1.29, when determined in 0.1 N sodium chloride.

Example XIV

Allyl-2-chloroallyldimethylammonium chloride when converted to the corresponding polymer, by the procedures of Example I, was found to produce the polymer in the same molecular weight and yield ranges as in Example I.

Example XV

Di-2-chloroallyldimethylammonium chloride was converted to the corresponding polymer by the procedure of Example III. Again, when the intrinsic viscosities of this polymer and the corresponding bromides, when determined in 0.1 N solutions of their respective alkali metal halides, were compared, the results were found to be consistent with those previously obtained.

Example XVI

Methallyl-2-chloroallyldimethylammonium chloride was polymerized according to the procedure of Example I. The polymer was obtained in the same molecular weight and yield ranges as in the previous examples.

Example XVII

N-allyl-N-methyl-2-vinylpiperidinium chloride was converted to the corresponding polymer by the procedure of Example III. The yield and molecular weight, as indicated by its intrinsic viscosity in 0.1 N sodium chloride was found to be comparable to previous polymers.

Example XVIII

N-allyl-N-methyl-2-vinylmorpholinium chloride when converted to the corresponding polymer by the procedure of Example I was found to yield results consistent with those previously obtained.

Example XIX

N - allyl - N-methyl-2-vinylpyrrolidinium chloride was polymerized by the procedure of Example III. The results of this polymerization were consistent with those previously obtained with other diallyl ammonium chlorides.

Example XX

N-N-dimethyl-2,5-divinylpiperidinium chloride was converted to the corresponding polymer by the procedure of Example II. The results were again consistent with those previously obtained.

Example XXI

N,N-dimethyl-2,5-divinylmorpholinium chloride when converted to the polymer was found to yield consistent results to those of previous examples.

Example XXII

N,N - dimethyl - 2,4-divinylpyrrolidinium chloride was converted to the corresponding polymer and was found to yield results consistent with other similar chloride salts of the previous examples.

Example XXIII

N,N-dimethyl-N',N'-diallylethylene diamine was quaternized in the usual way with methyl chloride to produce N,N,N,N' - tetramethyl-N',N'-diallylethylenediammonium dichloride. This salt was converted to the corresponding water soluble polymer by the procedure of Example III.

Example XXIV

N,N - dimethyl - N',N'-diallyltrimethylenediamine was quaternized in the usual way with two equivalents of methyl chloride to produce N,N,N,N'-tetramethyl-N',N'-diallyltrimethylenediammonium dichloride. This salt was polymerized by the procedure of Example III to produce a water soluble polyquaternary ammonium chloride of low equivalent weight per quaternary unity.

Example XXV

Dimethyldiallylammonium chloride (10 grams) was dissolved in distilled water (5 grams). This solution was suspended in ethylbenzene (50 ml.) by stirring at such a rate that the water solution was suspended in fine beads. The suspension was heated to 40° C., maintaining the stirring rate constant. After the temperature of 40° had been attained, t-butylhydroperoxide (.10 gram) was added. Heating and stirring was continued for 24 hours at 40° C. after which time the temperature was raised to 70° C. and continued for 24 hours. A large portion of the polymer was in the form of pearls or beads. The polymer was washed thoroughly with acetone and dried to yield 9.2 grams of water soluble polymer having an intrinsic viscosity of 1.52 in 0.1 N potassium chloride as solvent.

The following examples illustrate the conversion of the high molecular weight chloride salt polymers of the foregoing examples to high molecular weight polymer salts having different anions. The polymer salts cannot be obtained by direct polymerization of the monomers because of termination of the polymer chain at the low molecular weight level.

Example XXVI

A water solution of the product of Example III was passed over a quaternary ammonium anion exchange column which had been converted to the hydroxide form.

The effluent constituted a solution of diallyldimethylammonium hydroxide, having a pH of 12.5.

Example XXVII

The product of Example II in water solution was passed over a quaternary ammonium anion exchange column which had been converted to the bromide form. The effluent was an aqueous solution of polydiallyldimethylammonium bromide of high molecular weight. It has previously been shown to be impossible to obtain this polymer in high molecular weight by direct polymerization of diallyldimethlyammonium bromide.

Example XXVIII

An aqueous solution of polydiallyldimethylammonium chloride was passed through a quaternary ammonium anion exchange column which had been converted to the nitrate form. The effluent from the column was shown to be polydiallyldimethylammonium nitrate. The same product could be obtained by addition of the stoichiometric amount of silver nitrate to a solution of the chloride polymer.

Still further examples of the process and polymers provided by this invention include:

Example XXIX

Di(methoxyphenyl), diallyl ammonium chloride may be polymerized in water using as catalyst benzoyl peroxide in accordance with the procedure of Example I. A solid high molecular weight polymer is obtained.

Example XXX

Di(ethoxyethyl), dibromo allyl ammonium chloride may be polymerized in water using as catalyst benzoyl peroxide in accordance with the procedure of Example I. A solid high molecular weight polymer is obtained.

Example XXXI

Di(carbethoxyethyl), dichloroallyl ammonium chloride may be polymerized in water using as catalyst benzoyl peroxide in accordance with the procedure of Example I. A solid high molecular weight polymer is obtained.

Example XXXII

Di(4-fluorobutyl), diallyl ammonium chloride may be polymerized in water using as catalyst benzoyl peroxide in accordance with the procedure of Example I. A solid high molecular weight polymer is obtained.

Example XXXIII

Dicyanoethyl, dimethallyl ammonium chloride may be polymerized in water using as catalyst benzoyl peroxide in accordance with the procedure of Example I. A solid high molecular weight polymer is obtained.

Example XXXIV

Di(phenoxyethyl), diallyl ammonium chloride may be polymerized in water using as catalyst acetyl peroxide in accordance with the procedure of Example I. A solid high molecular weight polymer is obtained.

Example XXXV

Di(naphthoxyethyl), diallyl ammonium chloride may be polymerized in water using as catalyst acetyl peroxide in accordance with the procedure of Example I. A solid high molecular weight polymer is obtained.

Example XXXVI

Di(propylmercaptomethyl), diallyl ammonium chloride may be polymerized in water using as catalyst hydrogen peroxide in accordance with the procedure of Example I. A solid high molecular weight polymer is obtained.

Example XXXVII

Di(phenylmercaptoethyl), dimethallyl ammonium chloride may be polymerized in water using as catalyst hydrogen peroxide in accordance with the procedure of Example I. A solid high molecular weight polymer is obtained.

Example XXXVIII

Di(acetonyl), diallyl ammonium chloride may be polymerized in water using as catalyst hydrogen peroxide in accordance with the procedure of Example I. A solid high molecular weight polymer is obtained.

Example XXXIX

Di(cyclopentylmethyl), dimethallyl ammonium chloride may be polymerized in water using as catalyst barium peroxide in accordance with the procedure of Example I. A solid high molecular weight polymer is obtained.

Example XL

Di(cyclohexylmethyl), diallyl ammonium chloride may be polymerized in water using as catalyst barium peroxide in accordance with the procedure of Example I. A solid high molecular weight polymer is obtained.

Example XLI

Di(2-nitropropyl), diallyl ammonium chloride may be polymerized in water using as catalyst t-butyl hydroperoxide in accordance with the procedure of Example I. A solid high molecular weight polymer is obtained.

Example XLII

Di(2-carbonamide-ethyl), dimethallyl ammonium chloride may be polymerized in water using as catalyst peracetic acid in accordance with the procedure of Example I. A solid high molecular weight polymer is obtained.

Example XLIII

N,N-di(p-cyanophenyl)-2,6-divinyl piperidinium chloride may be polymerized in water using as catalyst di-n-butyl peroxide in accordance with procedure of Example I. A solid high molecular weight polymer is obtained.

Example XLIV

N,N-di(p-chlorophenyl) - 2,6 - divinyl morpholinium chloride may be polymerized in water using as catalyst perbenzoic acid in accordance with the procedure of Example I. A solid high molecular weight polymer is obtained.

Example XLV

N-methallyl-N-p-acetylphenyl - 2 - vinyl morpholinium chloride may be polymerized in water using as catalyst perbenzoic acid in accordance with the procedure of Example I. A solid high molecular weight polymer is obtained.

Example XLVI

N,N-di(m-ethylmercaptophenyl)-2,5-divinyl pyrrolidinium chloride may be polymerized in water using as catalyst barium peroxide in accordance with the procedure of Example I. A solid high molecular weight polymer is obtained.

Example XLVII

N - (phenylmercaptoethyl)-N-hydroxyethyl-2,6-divinyl pyrrolidinium chloride may be polymerized in water using as catalyst benzoyl peroxide in accordance with the procedure of Example I. A solid high molecular weight polymer is obtained.

Example XLVIII

N,N-diallylpyrrole was polymerized in water using as catalyst barium peroxide in accordance with the preceding examples, and a solid high molecular weight polymer was obtained having a molecular chain with the repeating units:

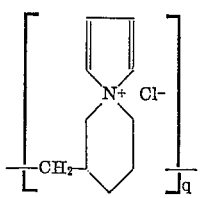

Example XLIX

N,N-diallylethyleneiminium chloride was polymerized according to the procedure of Example III, and a high molecular weight polymer was obtained. This polymer has an unusually low equivalent weight of quaternary ammonium salt groups even lower than the diallyldimethyl ammonium chloride polymer of Example I.

It will be appreciated that, in the same manner other di-unsaturated ammonium chloride monomers corresponding to the aforementioned formulate in col. 2 may be used in like fashion to obtain the high molecular weight polymeric product by the process of this invention, and further illustrations of the same by way of still more specific examples are not included herein in order to avoid unwarranted length. For instance, with reference to the last example, in place of the unsubstituted ethylene imonium ring structure, 1,2-dimethylethyleneimine structures may be employed.

Still other monomers having the requisite unsaturation characteristics and a quaternary ammonium chloride grouping may be used. For instance, 1,1-diallylpyrazolinium chloride and 1,1-diallylimidozolinium chloride may be used according to Example XLVII. In such monomers, the allyl grouping can be replaced by the chlorallyl or methallyl or phenylallyl radicals, as will be understood from the foregoing discussion. That is, the monomers employed in the present invention are quaternary ammonium chloride compounds having two sites of olefinic unsaturation, spaced apart by approximately the distance therebetween in a 1,6-diolefin, and adapted to form the closed ring structure during the polymerization action as described above.

These monomers are generally readily available or may be synthesized in conventional fashion. For instance, N-methylaniline may be reacted with two moles of allylchloride, to obtain N,N-diallyl, N-methyl, N-phenylammonium chloride. Alternatively, the procedure mentioned in Example IX may be used to quaternize a suitable diallyl teriary amine. In monomers having the quaternary nitrogen atom as part of a heterocyclic ring, it is convenient to quaternize the tertiary amine with allyl chloride. Where a 2,6- or 2,5- divinyl-substituted heterocyclic ring compound is involved, as in Examples 20, 21 and 22, etc., quaternization is achieved by reaction with the desired compound of the general formula A—Cl or B—Cl. It is believed apparent that the synthesis of such quaternary ammonium chloride monomers is within the skill of the art.

As a further example of a monomer suitable for use according to this invention to form a high nuclear weight polymer product, 2-vinylpyridine may be quaternized with allyl chloride, forming the compound, thus:

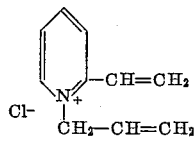

When polymerized, by, for instance, the procedure of Example I, this monomer forms a high molecular weight polymer of the general formula:

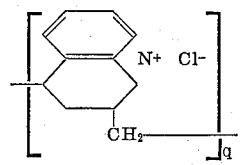

With further reference to Examples XXVI to XXVIII, the same anion exchange column technique may be used to convert the initially-formed chloride sale polymers of this invention to polymers having any of the anions: fluoride, chlorate, perchlorate, iodide, periodate, iodate, bromate, borate, cyanide, acetate (and other carboxylic acid anions) alkoxides, thioalkoxides, phenoxides and substituted phenoxides, thiophenoxides, fluoborate, nitrite, bisulfite, bisulfate, bicarbonate, and, in fact, any monovalent anion. Multivalent anions are not desired because they would tend to set up a kind of a cross-linkage between polymer chains through the salt groups, and adversely affect the preferred water solubility.

In the practice of the process of this invention, there are no physical signs of complete polymerization, however, during polymerization the highly fluid solution of the monomer and initiator or catalyst in the solvent is converted to a rigid, slightly opaque, very tough mass. This material, which comprises perhaps from 70% of solid polymer, can be ground or crushed to a fine powder and dried, or it can be extracted with a suitable solvent, to remove the reaction medium solvent and any residual monomer. Characteristically, the yields of solid polymer from the monomer approach 100%, and have an intrinsic viscosity in 0.1 N potassium chloride of between about 0.5 and 2.0.

As mentioned hereinabove, temperature ranges for the polymerization may vary between 0° and 100° C. for from about one to seventy-two hours, depending upon the temperature. It is preferred to operate in the temperature range of about 25° to 75° C., for a reaction time of between about twenty-four and thirty-six hours. The monomer concentration in the reaction medium may vary from between about 10 to 70–5%, it being preferred to operate at concentrations between about 50 and 70%. Generally, the upper limit of concentration is determined in practice by the solubility of the monomer in the reaction solvent, e.g., water, at the initial temperature of the polymerization cycle.

While water is generally the preferred reaction solvent, other solvents may also be used, for example, methanol, ethanol, dimethyl formamide, diethyl formamide, dimethyl acetamide, acetonitrile, dimethoxyethane, dioxane, or any other solvent which has a reasonable solvent power for the monomers. Polymerization may also be conducted in suspension in accordance with the procedure disclosed by us in J. Am. Chem. Soc. 74 2543 (1952). Catalyst concentrations which may be used remove from about 0.05% to about 5.0%, based on the amount of monomer, with the preferred ranges being from about 0.1 to 1.0% of catalyst based on the amount of monomer.

In the products obtained, the preferred materials are those in which R and R′ represent hydrogen, methyl or chloro substituents, and those in which A and B represent methyl radicals, because of the resulting lower equivalent rate of the quaternary ammonium unit. At least one of A or B could be phenyl and the other methyl without sacrifice of cost-efficiency because aniline is a very cheap material. A further preferred substituent for A or B is the hydroxy ethyl radical.

The polymer products of this invention generally have utility as spinning aids for textile materials, antistatic agents for textile materials, bacteriostatic and fungistatic agents, wet strength improvement agents for papers, and other textile aids, as accelerators for curing rubber, and as curing agents for epoxy resins, and as stabilization and regulation agents for particle size in suspension polymerization, and surface active agents.

An important further utility of these materials is as superior flocculating agents. While there are various flocculating agents used commercially today, one of the most important is alum, used for the clarity of water having suspended clays such as montmorillonite clays and the like. The high molecular weight polymer products of this invention, especially the ammonium chlorides, are surprisingly and advantageously effective if used in place of the alum. For instance, as an actual example, if water containing some 225 parts per million of turbidity (suspended montmorillonite clay particles and the like) is to be decreased to only five parts per million of turbidity (a common requirement), some one hundred forty-five pounds of alum per million gallons of water would be required to precipitate the clays, etc. Using the polymer products of this invention, even the most simple embodiments thereof, such as the product of Example I, only one part per million is required to achieve the same effect. In practice, water, for instance, sewage water, may be clarified by precipitating its turbidity content with the addition of like small amounts in the range of from about 0.5 to about 25 parts per million of the polymer products of this invention, adding the same to the turbid water at ambient temperatures, and, conveniently, agitating for some fifteen to forty-five minutes and then allowing a like time for the precipitating materials to settle out, leaving a crystal clear supernatant clarified water.

It will be appreciated that other modifications and variations in the practice of the invention may be used in addition to those specifically shown in the foregoing examples, and this invention is limited only by the spirit and scope of the claims appended hereto.

I claim:

1. A process for preparing a linear high molecular weight polymer which consists essentially in (1) mixing with an aqueous medium a quaternary ammonium chloride salt in which the quaternary ammonium ion is selected from the class consisting of:

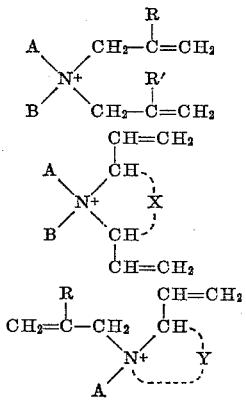

and

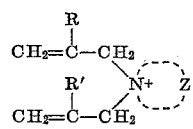

wherein

A and B independently represent a member selected from the class consisting of alkyl and phenyl radicals on which any substituents are selected from the group consisting of hydroxy, amido, carboloweralkoxy, loweralkoxy, phenoxy, naphthoxy, cyano, thioloweralkoxy, thiophenoxy, loweralkoyl, 5- and 6-membered cycloalkyl, tri(loweralkyl)ammoniumlower alkyl, with, on the alkyl groupings only, a nitro group, and, on the phenyl radicals only, a halogen atom; and, taken together, A and B represent a member selected from the group consisting of —CH$_2$—CH$_2$—, —CH(CH$_3$)—CH(CH$_3$)— —CH=CH—CH=CH—, —CH=CH—CH=N—, and —CH=CH—N=CH—;

R and R' independently represent a member selected from the group consisting of hydrogen, chloro, bromo, loweralkyl, and phenyl radicals;

X represents a divalent radical of the formula
—CH$_2$—(O)$_n$—(CH$_2$)$_m$

Y represents a divalent radical of the formula
—(CH$_2$)$_p$—(O)$_n$—CH$_2$—

Z represents a divalent radical of the formula
—(CH$_2$)$_p$—(O)$_n$—(CH$_2$)$_2$— and $n$ is one of the numbers 0 and 1;
$m$ is one of the numbers 1 and 2;
$p$ is one of the numbers 2 and 3;

(2) introducing into a reaction medium a catalytic amount of a free radical polymerization catalyst; (3) maintaining the resulting mixture at a temperature of between about 0° and about 100° C. from about 1 to about 72 hours, and until said polymerization is substantially completed, and (4) isolating the solid polymer from the reaction mixture, said polymer having an intrinsic viscosity in 0.1 N potassium chloride of at least between about 0.5 and about 2.0 and a linear homopolymeric molecular chain of repeating units of a formula selected from the class consisting of:

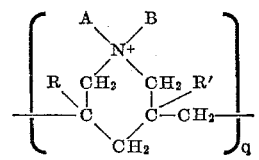

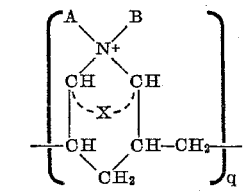

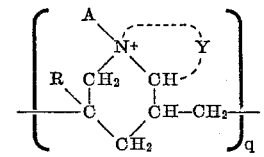

and

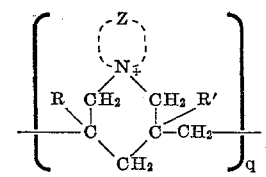

and the symbol Q is an integer representing the number of units in the molecular chain.

2. The process of claim 1, in which said quaternary ammonium ion has the formula:

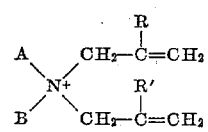

3. The process of claim 1, in which said quaternary ammonium ion has the formula:

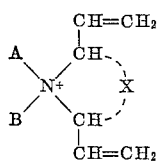

4. The process of claim 1, in which said quaternary ammonium ion has the formula:

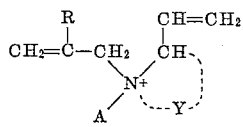

5. The process of claim 1, in which said quaternary ammonium ion has the formula:

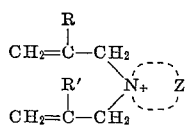

6. The process of claim 1, wherein said temperature is maintained between about 25° and 75° C. for a reaction time of between about 24 and 36 hours.

7. The process of claim 1, wherein the quaternary ammonium ion concentration in the reaction mixture is initially within the range of betweeen about 10 to 75% by weight.

8. The process of claim 7, wherein said monomer concentration is in the range of between about 50 and 75% by weight.

9. The process of claim 1, wherein said catalyst is present in an amount of between about 0.05% and 5.0% by weight based upon the amount of quaternary ammonium ion.

10. The process of claim 9, wherein said amount of said catalyst is between about 0.1 and 1.0%.

11. The process of claim 1, wherein said reaction medium is selected from the class consisting of water, lower alkanol, di(lower alkyl)formamide, di(lower alkyl)acetamide, acetonitrile, di(lower alkoxy)-ethane, and dioxane.

12. The process of claim 1, wherein said free radical polymerization catalyst is selected from the class consisting of di(lower alkyl)peroxides, lower alkyl hydrogen peroxides, diacyl peroxides, and peracids.

13. Linear high molecular weight water-soluble quaternary ammonium chloride polymers having a homopolymeric molecular chain of repeating units of a formula selected from the group consisting of:

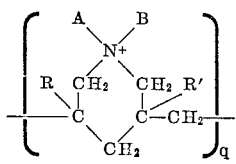

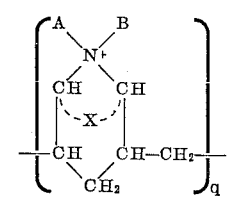

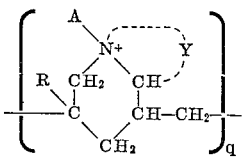

and

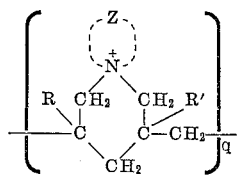

said polymer having an intrinsic viscosity in 0.1 N potassium chloride of at least between about 0.5 and 2.0, and wherein A and B independently represent a member selected from the class consisting of alkyl and phenyl radicals on which any substituents are selected from the group consisting of hydroxy, amido, carboloweralkoxy, loweralkoxy, phenoxy, naphthoxy, cyano, thioloweralkoxy, thiophenoxy, loweralkoyl, 5- and 6-membered cycloalkyl, tri-(loweralkyl)ammoniumloweralkyl, with, on the alkyl groupings only, a nitro group, and, on the phenyl radicals only, a halogen atom; and, taken together, A and B represents a member selected from the group consisting of

—CH$_2$—CH$_2$—, —CH(CH$_3$)—CH(CH$_3$)—
—CH=CH—CH=CH—, —CH=CH—CH=N— and

—CH=CH—N=CH—

R and R' independently represent a member selected from the class consisting of hydrogen, chloro, bromo, loweralkyl, and phenyl radicals;

X represents a divalent radical of the formula

—CH$_2$—(O)$_n$—(CH$_2$)$_m$—

Y represents a divalent radical of the formula

—(CH$_2$)$_p$—(O)$_n$—CH$_2$—

Z represents a divalent radical of the formula

—(CH$_2$)$_p$—(O)$_n$—(CH$_2$)$_2$— and $n$ is one of the numbers 0 and 1;
$m$ is one of the numbers 1 and 2;
$p$ is one of the numbers 2 and 3 and the symbol Q is an integer representing the number of units in the molecular chain.

14. The polymers of claim 13, in which said repeating unit has the formula:

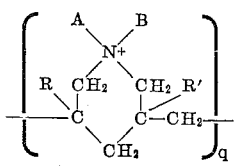

15. The polymers of claim 13, in which said repeating unit has the formula:

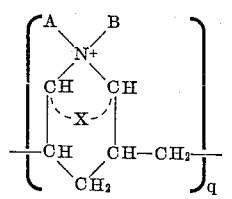

16. The polymers of claim 13, in which said repeating unit has the formula:

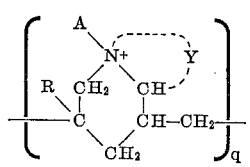

17. The polymers of claim 13, in which said repeating unit has the formula:

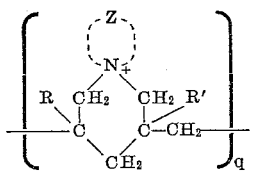

18. A process for the manufacture of water-soluble homopolymeric quaternary ammonium polymers having a repeating unit of the formula selected from the class consisting of:

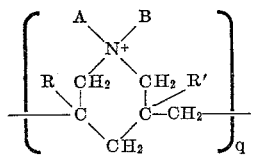

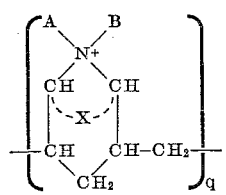

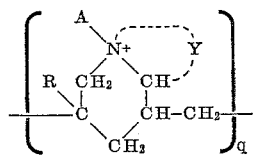

and

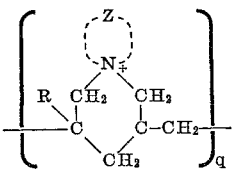

and an anion selected from the class consisting of fluoride, bromide, iodide, hydroxide, nitrate, chlorate, perchlorate, periodate, iodate, bromate, borate, cyanate, acetate, lower alkoxide, thiolower alkoxide, phenoxide, thiophenoxide, fluobromate, nitride, bisulphite, bisulphate, and bicarbonate, which comprises converting the corresponding quaternary ammonium linear high molecular weight water-soluble chloride homopolymer to the said anion by passing the same over an ion exchange column in aqueous medium, said anion exchange column being in the form of said anion.

19. A process for the preparation of linear high molecular weight polymer which consists essentially in (1) mixing with an aqueous medium a quaternary ammonium chloride salt having the formula:

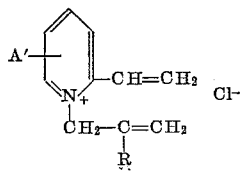

wherein

A' represents a member selected from the class consisting of halogen, hydroxy, amido, carbolower-alkoxy, loweralkoxy, phenoxy, naphthoxy, cyano, thioloweralkoxy, thiophenoxy, loweralkoyl, and 5- and 6-membered cycloalkyl;

R represents a member selected from the class consisting of hydrogen, chloro, bromo, loweralkyl, and phenyl radicals;

(2) introducing into a reaction medium a catalytic amount of a free radical polymerization catalyst; (3) maintaining the resulting mixture at a temperature between about 0° and about 100° C. from about 1 to about 72 hours, and until said polymerization is substantially completed; and (4) isolating the solid polymer from the mixture, said polymer having an intrinsic viscosity in 0.1 normal potassium chloride of at least between about 0.5 and about 2.0 and a linear homopolymeric molecular chain of repeating units of the formula:

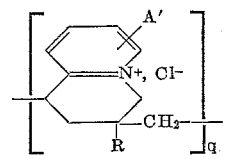

20. The linear high molecular weight water-soluble quaternary ammonium chloride polymer having a homopolymeric molecular chain of repeating units of the formula:

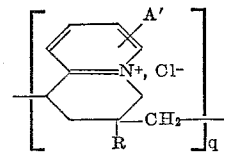

wherein

A' represents a member selected from the class consisting of halogen, hydroxy, amido, carbolower-alkoxy, loweralkoxy, phenoxy, naphthoxy, cyano, thioloweralkoxy, thiophenoxy, loweralkoyl, and 5- and 6-membered cycloalkyl;

R represents a member selected from the class consisting of hydrogen, chloro, bromo, loweralkyl, and phenyl radicals carrying A' as a substituent; and q is an integer representing the number of units in the molecular chain.

References Cited by the Examiner
UNITED STATES PATENTS 2,926,161   2/1960   Butler _____ 260—89.7

OTHER REFERENCES

C. & EN, Mar. 11, 1957, pages 22 and 24.

Butler et al.: J.A.C.S., vol. 73, pages 895–6, March 1951.

WILLIAM H. SHORT, *Primary Examiner.*

J. C. MARTIN, *Assistant Examiner.*